July 22, 1969    J. H. MILLER    3,457,118
STORAGE BATTERY TERMINAL CONNECTORS
Filed June 21, 1967

INVENTOR
JAMES H. MILLER
BY Stryker and Jacobson
ATTORNEYS

United States Patent Office 3,457,118
Patented July 22, 1969

3,457,118
STORAGE BATTERY TERMINAL CONNECTORS
James H. Miller, Minneapolis, Minn., assignor to Gould-National Batteries, Inc., St. Paul, Minn., a corporation of Delaware
Continuation-in-part of application Ser. No. 434,403, Feb. 23, 1965. This application June 21, 1967, Ser. No. 647,800
The portion of the term of the patent subsequent to Aug. 15, 1984, has been disclaimed
Int. Cl. H01m 5/00
U.S. Cl. 136—135          6 Claims

ABSTRACT OF THE DISCLOSURE

A battery terminal connector having a male lug for extending through an opening in a battery side wall and into a force fit engagement with a female lug.

---

This invention relates to improvements in storage battery terminal connectors and more specifically to terminal connectors which extend from the outside through an outer wall or the casing of a storage battery into a battery cell. This application is a continuation-in-part of my copending application Ser. No. 434,403, filed Feb. 23, 1965 which is now Patent No. 3,336,164.

In the ordinary automobile storage battery the battery terminals by which electrical connection is made from the battery power source to the various utilization devices are usually located at the top of the battery. The terminal posts go through the battery cover into the cell. An important reason for this arrangement was because of difficulties encountered in the past in sealing off openings through the battery wall to prevent leakage of liquid electrolyte. Automobile batteries are normally mounted in a manner such that there is little or no likelihood of electrolyte flowing out the top. However, there are instances where it may be preferable or more convenient to have the terminal located at the side or the bottom of the storage battery. Some batteries have been made in this fashion and they generally have been made with either bushings or resin material as means for sealing around the opening where the connector passes through the battery wall. Also, in batteries of this nature ordinarily electrical contact between the external terminal and the electrodes within the cell has been made by "burning" to fuse the two together. Connections made in this manner have required many process steps in the battery assembly which increases the cost of the battery. Oftentimes the connections have been unreliable or have failed early during service life of the battery. Variations in the making of battery terminals of this nature include the use of soft deformable metallic pins which have been held in place against the terminal lugs by annular deformations. Ordinarily, this type of construction required that a first connection be made between a lug and the battery electrode or plate inside the cell and another connection be made at the other end of the lug to the terminal located outside the battery wall, with the lug passing through an opening in the wall. As a feature of my invention, the lug can be made an integral part of the battery plate so that only one connection need be made to attach the external terminal to the lug and thereby make the connection to the battery plate inside the casing. Preferably, this connection is made within the confines of the casing.

As a further feature of this invention, leakage of fluid through the battery wall in the area around the opening where the terminal passes through the wall is guarded against without requiring elastic gaskets or separate sealing agents. The battery container or casing is made out of a synthetic resin which has a sufficient degree of elasticity so that it presses tightly against the terminal when the terminal made of relatively soft metal is deformed by pressure when forcing the connection through the wall of the battery.

The preferred embodiment of this invention comprises a two-piece terminal connector having a male and a female connector lug portion. The rod-like extension on the male lug portion is pressed through an opening in the battery casing and mates with an opening in the female lug portion which is located inside the battery wall. By suitable application of pressure, the male extension is deformed sufficiently to make a fluid-tight seal with the casing and a firm electrical and mechanical attachment to the female portion. This type of connection reduces the number of parts that have to be handled during battery assembly, reduces the number of process steps necessary to make an acceptable connection, minimizes the likelihood of subsequent malfunction or discontinuity of the electrical connection and considerably diminishes the likelihood of loss of electrolyte through leakage. All of this comes about by constructing and joining the mating male and female parts of the terminal in such a manner that by applying pressure in a suitable fashion not only is that portion of the connector which passes through the wall caused to fit tightly in and completely fill the opening to seal against possible leakage, but also that portion which is joined to the lug inside of the battery is caused to expand and make a tight mechanical and electrical connection within the battery cell.

Objects and features of this invention will become apparent during the course of the following detailed description with reference to the accompanying drawings, in which.

The outer wall 10 of the battery casing or container may be constructed in any well known fashion out of any of numerous well known insulating materials. Typically, the walls are made out of a somewhat elastic material which is adapted to be formed without breaking or cracking. Examples of materials which have been found suitable for this purpose and particularly in conjunction with the present invention are high molecular weight polypropylene or similar rubbery acid-resistant materials which are not hard or brittle. The outside wall 10 through which the terminal connection is to be made is prepared by drilling, punching or otherwise forming an opening 11 of the desired shape and size at a predetermined location on the wall. The opening 11 should be clean of dirt, burrs and any foreign matter which might interfere with a fluid-tight seal around the periphery of the opening. The terminal connector of the present invention may be made in any of a variety of possible configurations with the desired shape, size and style being a matter of choice depending upon the use to which it is to be put. Preferably, the terminal connector is formed from a soft, somewhat malleable conductive metal such as lead or lead alloy connectors commonly found in lead acid batteries.

Figure 1:
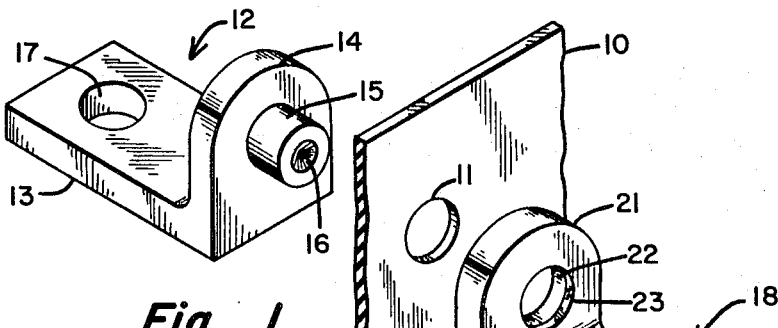
FIG. 1 is a blown apart somewhat functional perspective view illustrating a preferred embodiment of this invention.
Figure 5:
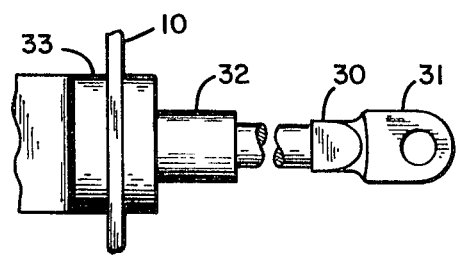
FIG. 5 illustrates another embodiment of the invention in which the terminal contains a threaded post.

In the embodiment illustrated in FIG. 1, the external terminal 12 consists of three main portions. The horizontal strap portion 13 has a vertically oriented male lug portion 14 integrally formed at one end. The latter contains a rod-like extension 15 which has an annular recess 16 at its unattached end. The strap portion 13 contains an opening 17 to which a utilization device can be electrically connected. Located within the battery cell for making connection to the electrodes is cell connector 18. The cell connector consists of a horizontal strap portion 20 which has an integrally formed vertical female lug portion 21 at one end which contains an aperture 22 at a location and having a configuration to coincide with opening 11 in the wall 10 and to mate with the extension 15. As illustrated more clearly in FIG. 2, at its edge 23 furthest away from the battery wall, opening 22 is flared outward. Typically, extension 15 has a cross-section dimension which is only slightly larger than the inner dimension of opening 22 but is somewhat less than the dimension of the flared portion 23. Although not shown in the drawings, ordinarily the strap portion of connector 18 is attached at its other end to battery cell plates or electrodes.

Figure 2:
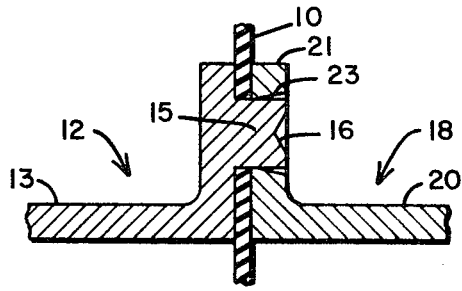
FIG. 2 is a sectioned view illustrating the relative positions of the two mating parts of the embodiment illustrated in FIG. 1 as they appear during an intermediate step in making the connection through the battery wall.
Figure 3:
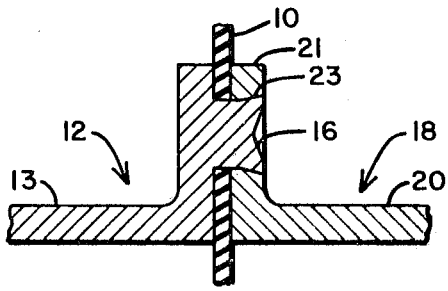
FIG. 3 is a sectional view similar to FIG. 2 illustrating the final position of the mated parts.

In FIG. 1, the various parts are shown in their relative positions prior to but ready for assembly. FIG. 2 illustrates how the parts appear during an intermediate step of the assembly and FIG. 3 illustrates their appearance after completion of the assembly. It can be observed in FIG. 3 that extension has been somewhat deformed at its end so that the metal is flared outward along edge 23 so that it substantially fills that portion of opening 22. This provides a secure mechanical and electrical connection. As will be described later in more detail, when the metal is flared outward from recess 16, the remainder of extension 15 is compressed longitudinally so that it expands somewhat radially to press more firmly against the periphery of opening 11 in wall 10 thereby further ensuring a fluid-tight seal.

Some typical illustratively dimensions for the various parts of the invention, with no limitation thereto being intended, are as follows. The outer diameter of the extension 15 may be in the order of .003 inch greater than the diameter of hole 11 in the wall 10 and the surface of the flared area 23 in opening 22 may be cut at an angle approximately 10° to the axis of the opening.

In assembling the battery utilizing the teachings of the present invention, the opening 11 is initially formed in the outside wall of the battery casing at appropriately selected sites and by any suitable method such as punching or drilling. The openings may be formed in the end or side walls or even the bottom wall, depending on the nature of the use to which the battery is to be put. The location of the opening is selected so that it will line up with the location of opening 22 in the connector 18. Correspondingly, if the location of the opening 11 is critical, then the connector 18 can be designed so that its opening 22 will be positioned opposite opening 11. The connector 18 is attached at one end to be an integral part of the battery electrode or plate. This can be done in any convenient fashion and does not constitute part of the present invention. The electrodes or plates, with the connector 18 attached, are then inserted into the battery cell in a manner that the opening 22 will line up with opening 11 in the wall and the vertical lug portion 21 will rest close against the inside of wall 10. Connector 12 is then positioned so that the extension 15 is lined up with openings 11 and 22.

With the parts positioned in this manner, pressure plates are then brought to bear on lugs 14 and 21 on opposite sides of the wall 10 to force them together so that extension 15 is force-fitted through opening 11 and the lug portions 14 and 21 are against the wall 10. The pressure plate bearing on lug 21 preferably has an opening aligned with opening 22 which is large enough so that the plate will not bear on extension 15 in the event it is long enough to extend beyond lug portion 21. Pressure in the order of and as high as 2,000 p.s.i. may be applied. This has the effect then of forcing the extension 15 through the wall opening 11, mating it with opening 22 in connector 18 and pressing both lugs 14 and 21 firmly against the wall 10. The parts joined together in this manner are most clearly illustrated in FIG. 2. A pressure mandrel is then brought to bear on the recessed area 16 to apply pressure axially to the extension 15. This produces a two-fold result, the end portion of the extension 15 flares outwardly to press firmly against the surface 23 in the connector lug 21 and there is a tendency for the extension 15 to expand radially to press even more firmly against the inner surface of opening 11 in wall 10 to further assure a fluid-tight seal in that area. The force fit of extension 15 of connector 12 to lug 21 of connector 18 provides a very low resistance electrical connection and a solid mechanical attachment between those two parts so that a good electrical connection is assured between the battery and the external utilization devices.

Additional holding strength may be obtained by fusing the outer end portion of extension 15 to the immediately adjacent portion of lug 21. For this fusing operation the battery casing may be set on its side so that a suitable torch flame may be caused to impinge on the surface of lugs 21 and the immediately adjacent end portion of extension 15. Alternatively, the heat may be applied by contact with a heated tool which will cause the metals to fuse together. Care should be taken when fusing these together to assure that the temperature in the area of the opening in wall 10 is not elevated to a high enough level to affect the pressure seal which was made earlier. Both the degree of temperature and the rate of heat application should be controlled to prevent any adverse effects on the wall material.

It is contemplated that the battery terminal can be provided with a wide variety of means for making the electrical connections to the utilization devices. For example, in FIG. 4, a heavy-duty wire 30 with lug 31 attached at one end, may be embedded at its other end in the terminal 32 which extends outside of the battery wall 10 but is mated with an internal connector 33. The fluid-tight seal through the opening in the wall 10 and the low resistance electrical connection inside the battery cell can be achieved in the same fashion as described above.

Figure 4:
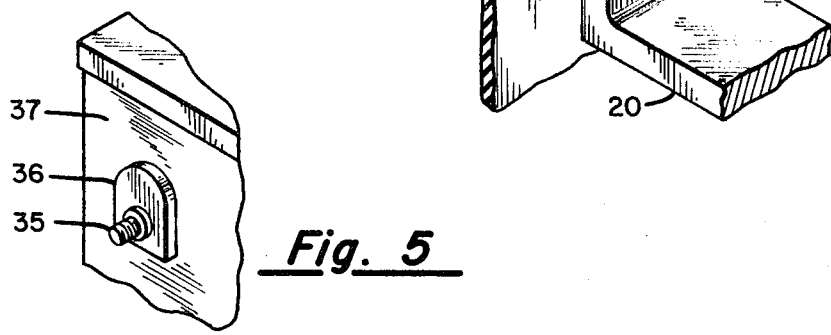
FIG. 4 is a sectioned view illustrating another embodiment of the invention in which the external terminal contains a heavy-duty wire and terminal lug.

FIG. 4 illustrates a further adaptation of the external terminal in which a threaded rod 35 is securely embedded in the terminal 36 to provide means for making electrical connection to the battery with a threaded attachment. The terminal 36 can be joined to an internal connector, not shown, to make the electrical connection and the fluid-tight seal through a suitable opening in the wall 37 can be made in the same manner as described above. From the foregoing described embodiments it can be envisioned that a large variety of terminal connectors can be made to accommodate a variety of electrical connections.

As a further improvement, the terminal may be made with a detent or the like on the outside lug portion which will fit into a slot or recess on the outside of the wall to stabilize the terminal and keep it from rotating or twisting in the event an appreciable amount of torque is applied.

Although in the embodiments described herein the male lug portion is located outside the wall and the female lug portion is located within the wall confines, the reverse arrangement can also be made without detracting from the features of the invention.

I claim:

1. An external terminal for a storage battery, comprising in combination: a male lug portion located on one side of an outer wall of a storage battery; a female lug portion located on the opposite side of said outer wall; said male lug portion containing an extension passing through an opening in said outer wall into force-fit engagement with said female lug portion; the lug portion located outside the outer wall containing means for making electrical connection to remotely located utilization devices and the lug portion located within the confines of said outer wall being integrally attached to battery electrodes.

2. The invention as in claim 1 wherein said extension is expanded radially outward forming a pressure deformed fluid-tight seal around the opening through said outer wall.

3. The invention as in claim 2 wherein said male and female lug portions are located directly opposite one another on opposite sides of said outer wall and are forcibly pressed against said outer wall around the wall opening.

4. The invention as in claim 2 wherein said male lug portion is located outside the battery wall and said extension extends into the battery interior through the wall opening; the end of said extension located within the battery having a recess, the part of the extension which surrounds the recess being flared outward into force-fit engagement with said female lug portion.

5. The invention as in claim 4 wherein said means contained in the lug for making the electrical connection comprises a heavy duty wire cable having one end firmly embedded in said lug.

6. The invention as in claim 4 wherein said means contained in the lug for making the electrical connection comprises an externally threaded rod member rigidly attached to said lug.

References Cited

UNITED STATES PATENTS

| 1,425,924 | 8/1922 | Willard | 136—134 |
| 1,910,788 | 5/1933 | Binder. | |
| 2,132,793 | 10/1938 | Kyle. | |
| 2,210,450 | 8/1940 | Flynn. | |
| 2,620,370 | 12/1952 | Chapman. | |
| 2,692,906 | 10/1954 | Morgan. | |
| 3,336,164 | 8/1967 | Miller | 136—134 |

FOREIGN PATENTS

| 869,763 | 6/1961 | Great Britain. |

WINSTON A. DOUGLAS, Primary Examiner

D. L. WALTON, Assistant Examiner